United States Patent [19]

Baron

[11] 4,272,358

[45] Jun. 9, 1981

[54] PROCESS FOR REDUCING CARBON MONOXIDE EMISSIONS FROM REGENERATORS OF CATALYTIC CRACKING UNITS

[75] Inventor: Kenneth Baron, Diamond Bar, Calif.

[73] Assignee: Union Oil Company of California, Los Angeles, Calif.

[21] Appl. No.: 54,984

[22] Filed: Jul. 5, 1979

[51] Int. Cl.³ .............................................. C10G 11/05
[52] U.S. Cl. .................................. 208/120; 208/121; 252/410; 252/411 R; 252/412; 252/419; 252/455 Z; 252/462
[58] Field of Search ............................... 208/120–121, 208/113–119, 122–124; 252/410–412, 462, 419

[56] References Cited

U.S. PATENT DOCUMENTS

| | | | |
|---|---|---|---|
| 3,483,136 | 12/1969 | Plas et al. .......................... | 252/410 X |
| 3,823,092 | 7/1974 | Gladrow ........................... | 252/455 Z |
| 3,930,987 | 1/1976 | Grand ................................. | 208/111 |
| 4,115,250 | 9/1978 | Flanders et al. ................... | 208/120 |
| 4,137,151 | 1/1979 | Csicsery ............................. | 208/120 |
| 4,146,463 | 3/1979 | Radford et al. .................... | 208/120 |
| 4,153,535 | 5/1979 | Vasalos et al. .................... | 208/120 |

Primary Examiner—Delbert E. Gantz
Assistant Examiner—G. E. Schmitkons
Attorney, Agent, or Firm—Gregory F. Wirzbicki; Dean Sandford

[57] ABSTRACT

Catalytic cracking processes are improved by employing cracking catalyst particles containing rare earth components spray impregnated thereon. In comparison to other rare earth-promoted cracking catalysts, the cracking catalysts of the invention exhibit greater activity for oxidizing carbon monoxide to carbon dioxide during the regeneration step of the cracking process wherein coke-containing catalyst particles are reactivated for cracking hydrocarbons by combustion of the coke.

15 Claims, No Drawings

PROCESS FOR REDUCING CARBON MONOXIDE EMISSIONS FROM REGENERATORS OF CATALYTIC CRACKING UNITS

BACKGROUND OF THE INVENTION

This invention relates to a method for reducing carbon monoxide emissions from the regenerator utilized in catalytic cracking processes, such as the fluidized catalytic cracking process, by incorporating in the cracking catalyst a metal component active for the oxidation of carbon monoxide to carbon dioxide. More specifically, the invention relates to cracking catalyst compositions wherein rare earth components are incorporated into the cracking catalyst by spray impregnation.

In the petroleum industry, high boiling hydrocarbon feedstocks are charged to FCC units so that, by contact with a moving bed of catalyst particles, the feedstock is converted to a more valuable hydrocarbon product, such as gasoline, having a lower average molecular weight and a lower average boiling point than said feedstock. The most typical hydrocarbon feedstock so treated in FCC units consists of heavy gas oil, but on occasion such feedstocks as light gas oils, naphtha, reduced crudes, and even whole crudes are also subjected to catalytic cracking to yield low boiling hydrocarbon products.

Catalytic cracking in FCC units is usually accomplished in a cyclic process involving catalytic reaction, steam stripping, and catalyst regeneration. The hydrocarbon feedstock is blended with an appropriate amount of catalyst particles, and the mixture so produced is then passed through a catalytic reactor, commonly called a riser, wherein a catalytic cracking reaction zone is maintained such that at a temperature between about 800° and 1100° F. the feedstock is converted into gaseous, lower boiling hydrocarbons. After these lower boiling hydrocarbons are separated from the catalyst in a suitable separator, such as a cyclone separator, the catalyst, now deactivated with deposited coke is passed to a stripper. In the stripper, the deactivated catalyst is contacted with steam so as to convert some of the coke to hydrocarbon product vapors, which are then combined with the vapors received from the cyclone separator and transferred to other facilities for further treatment. Meanwhile, catalyst particles are recovered from the stripper, and because only a small proportion of the coke was removed in the stripper, the catalyst is introduced into a regenerator wherein, by combustion in the presence of an oxygen-containing gas such as air, the remaining larger proportion of the coke is removed and the catalyst reactivated. The cyclic process is then completed by again blending the reactivated catalyst particles with the feedstock entering the FCC unit.

One recognized problem in the conventional FCC process resides in the incomplete combustion in the regenerator. Due to the relatively low temperature of combustion in the regenerator, usually between about 900° and about 1300° F., the flue gas contains a substantial proportion of carbon monoxide in addition to carbon dioxide. Typically, the flue gas contains carbon dioxide and carbon monoxide in a ratio of 0.8:1 to about 10:1, $CO_2:CO$, with the carbon monoxide concentration often being as high as 15 mole percent. Such high concentrations of carbon monoxide are a source of concern inasmuch as it is a pollutant, and this concern has recently resulted in numerous methods to reduce the amount of carbon monoxide discharged from FCC regenerators and the like. In general, these methods aim to reduce the polluting effects of carbon monoxide by incorporating in the cracking catalyst particles metal components that are active for catalyzing the reaction of CO with oxygen at the low temperatures encountered in FCC regenerators. The metal components known for such use include the Group VIII metals and rhenium, as disclosed in U.S. Pat. No. 4,072,600, chromium, as described in U.S. Pat. No. 2,647,860, Group IB, IIB, VIB, VIIB, and VIII metals, as disclosed in U.S. Pat. No. 3,364,136, and certain rare earth metals, such as cerium, as taught in Netherlands Pat. No. 7300884 (GLADROW U.S. Pat. No. 3,823,092), and lanthanum, as taught in U.S. Pat. No. 4,137,151.

Of the foregoing metal promoters, platinum and the other noble metals are known to have the highest activity for oxidizing carbon monoxide. Ironically, however, such high activity is oftentimes undesirable and detrimental. In some FCC units, and especially those of older design, the high conversions of CO to $CO_2$ attainable with a platinum-containing catalyst release heat in such large quantities that the temperature of the regenerator vessel is raised to levels that overheat the metals within the regenerator vessel. On the other hand, some metal promoters, such as rare earth promoters, usually do not sufficiently improve CO oxidation activity to justify the expense of incorporating them in cracking catalyst particles.

Accordingly, it is an object of the invention to provide a metal-promoted cracking catalyst of CO oxidation activity greater than that of prior art rare earth catalysts but less than that of the typical platinum-promoted FCC catalyst. It is another object to provide a method for increasing the CO oxidation activity of rare earth-promoted cracking catalysts by spray impregnating the rare earth components onto the cracking catalyst particles. These and other objects and advantages will become apparent in light of the following description of the invention and its preferred embodiment.

SUMMARY OF THE INVENTION

According to this invention, one or more rare earth components are incorporated on cracking catalyst particles to improve the activity of such particles for oxidizing carbon monoxide produced in the regenerator of a conventional cracking unit and thus reduce the polluting effects of carbon monoxide by its conversion to the more innocuous component, carbon dioxide. The method by which the rare earth components are incorporated on the catalyst particles is by spray impregnation, i.e., by spraying the impregnant solution containing the one or more rare earth components onto the catalyst particles in the form of a fine mist. Subsequent calcination at an elevated temperature sufficient to convert the rare earth components to the oxide forms produces a catalyst more active than if the catalyst particles had been incorporated with a rare earth component by immersion into the impregnant solution. The catalyst activity is such that the conversion rate of carbon monoxide to carbon monoxide is within a control range that is highly active for the intended oxidation but insufficient for causing spot overheating and resultant metallurgical failures within the regenerator vessel.

DETAILED DESCRIPTION OF THE INVENTION

This invention is directed to an improvement in catalytic cracking processes utilized in the petroleum industry to convert hydrocarbons in the absence of added hydrogen to more valuable products. In accordance with the preferred embodiment of the invention, a rare earth component is incorporated into the cracking catalyst so that a controlled conversion of carbon monoxide to carbon dioxide is accomplished in the regenerator, thereby reducing the amount of polluting carbon monoxide discharged from the regenerator with the flue gas without concomitantly causing damage due to overheat in the regenerator vessel and associated equipment.

The catalysts with which the rare earth component(s) are composited may include any high-activity cracking catalyst known in the art as useful for accelerating the conversion of hydrocarbon feedstocks into products of lower average molecular weight and lower average boiling point. Especially contemplated are cracking catalysts useful in the fluidized catalytic cracking process. Typically, such catalysts are in particulate form, usually of about 10-200 microns and preferably about 60-70 microns in diameter, and comprise one or more zeolite components dispersed in a porous refractory oxide matrix. Usually, the zeolite component comprises about 1 to about 50%, preferably 10 to about 30% by weight, of the cracking catalyst. The remainder is composed of such relatively inert refractory oxides as alumina, silica, and silica-alumina. The inert materials are required in the catalyst to control its activity and prevent excessive coking in the catalytic cracking reaction zone.

The zeolite utilized in the cracking catalyst particles may comprise any of a number of natural and synthetic crystalline aluminosilicate zeolites known in the art as effective for cracking hydrocarbons under suitable conditions. The most preferred crystalline aluminosilicate zeolites are those which have found widespread use in the petroleum industry, namely, Zeolite X and Zeolite Y, two synthetic zeolites described more completely in U.S. Pat. Nos. 2,882,244 and 3,130,007, respectively. As is well-known, both natural and synthetic zeolites are made more stable and more active for hydrocarbon cracking purposes when the sodium content thereof is reduced to less than about 0.5 wt.% (as sodium). This is accomplished by ion-exchanging the zeolite such that the sodium ion is replaced by a rare earth metal ion or by hydrogen ion. The methods by which such ion exchange is accomplished are well-known and need not be described in detail here. However, it is important to note that if a rare earth metal is used for ion exchange purposes, such rare earth metal does not function in the same manner as the rare earth components subsequently introduced in accordance with the invention. The purpose of the rare earth components in the invention is to increase the catalyst's activity for carbon monoxide oxidation, and the method by which such components are introduced, i.e., by spray impregnation, is designed to minimize ion exchange and maximize the proportion of the rare earth promoter on the surface of the catalyst particles. Accordingly, it will be understood by those skilled in the art that future references herein to the proportions of rare earth promoter in the catalyst of the invention do not include that proportion of rare earth metal that may be present in the catalyst due to ion-exchange with sodium ion.

In accordance with the invention, the foregoing zeolite-containing catalysts or other catalysts having activity for cracking hydrocarbons are then incorporated with one or more rare earth components selected from the group consisting of lanthanum, cerium, praseodymium, neodymium, samarium, europium, gadolinium, terbium, dysprosium, holmium, erbium, thulium, ytterbium, lutetium, and the compounds thereof. The one or more rare earth components are incorporated into the catalyst particles such that the resulting metal-promoted catalyst contains between about 1 and about 10 weight percent of total rare earth metals, preferably between about 3 and 4 weight percent of total rare earth metals (calculated as $Re_2O_3$ oxides) exclusive of any rare earth metals introduced into the catalyst by ion exchange to reduce the content of sodium and other alkali metals in any zeolites contained in the catalyst. The most preferred rare earth components for use in the invention are those containing lanthanum, cerium, gadolinium, neodymium, or combinations thereof. Also preferred are mixtures of rare earth compounds obtained from rare earth ores by such methods as extraction with an inorganic acid, such as hydrochloric acid if the rare earth compounds are desired in the chloride form and nitric acid if desired in the nitrate form.

The critical feature of the invention herein resides in the method by which the one or more rare earth compounds are incorporated with any of the foregoing cracking catalyst particles. The catalyst is sprayed with sufficient of a solution containing one or more dissolved rare earth compounds, preferably in the form of nitrates or chlorides, so as to uniformly disperse upon the particles the desired percentage of one or more rare earth components. In an alternative but non-preferred embodiment of the invention, impregnation may be accomplished with a plurality of different impregnant solutions sprayed in succession upon the catalyst particles. The spraying is accomplished via an atomizer or other means for producing a fine mist. The mist is preferably such that no large droplets of impregnant solution form among the catalyst particles, and the particles are preferably rotated, as in a kiln, during the contacting with the mist impregnant so as to insure uniform impregnation of the solution onto the surfaces of the catalyst support. Alternatively, uniform impregnation can be accomplished by spraying the impregnant solution onto catalyst particles carried on a vibrating conveyor belt. In general, the volume of solution sprayed as a mist will be in the range of 50% to 200% of the volume of the catalyst particles, with the concentration of the rare earth component(s) dissolved in the impregnant solution being adjusted so that the desired proportion of rare earth component(s) is impregnated onto the catalyst particles. Usually, best results are achieved with volumetric ratios of impregnant solution to catalyst particles of about 0.5:1 to about 0.75:1.

It will be understood that the foregoing impregnation procedure, termed for convenience herein as spray impregnation, differs substantially from the spray drying techniques of the prior art. In spray drying, a colloidal suspension of catalyst particles in an impregnant solution is prepared and then injected through an atomizer into a dryer maintained at an elevated temperature, usually above about 500° F. In the spray impregnation technique of the invention, however, the catalyst particles never contact the impregnant solution except in the form of a mist, which is sprayed onto said particles as uniformly as possible.

Following impregnation of the catalyst particles, the resulting composite is preferably allowed to dry, usually under ambient conditions for at least 1 hour. Alternatively, the composite may be dried for a shorter time period by subjecting the composite to elevated temperatures of about 100°-400° F. Under such high temperature conditions, effective drying can be accomplished in as little as 10 minutes, but preferably the composite is dried for at least one-half hour.

Subsequent to drying, the composite is calcined so as to convert the rare earth component(s) to the oxide form. The calcination is preferably accomplished by contacting the composite with air for at least two hours under conditions including an elevated temperature above about 900° F., usually between about 900° F. and 1600° F.

In the preferred embodiment of the invention, fresh, conventional cracking catalyst particles may be incorporated with the rare earth component(s) according to the spray impregnation procedure described hereinabove. In other embodiments of the invention, the spray impregnation with a solution containing dissolved rare earth component(s) is applied to catalyst particles previously used in a catalytic cracking unit. If the latter embodiment is employed, it is highly preferable that the catalyst particles be essentially free of coke, that is, any coke on the catalyst particles should be combusted so as to reduce the proportion of coke on the catalyst particles to less than about 0.5 percent of the total catalyst weight (including any components residing thereon from use in the cracking unit). In yet other embodiments, the spray impregnation with rare earth components may be accomplished during the preparation of the cracking catalyst itself, as by impregnation just prior to final drying of the manufactured catalyst.

The rare earth catalysts prepared in accordance with the invention are highly useful in the conventional FCC process. In addition to having substantial activity for cracking hydrocarbons in the riser wherein the cracking reactions take place, the catalysts have high activity for oxidizing carbon monoxide to carbon dioxide under conditions normally maintained in the regenerator of the FCC unit. Typical regenerator conditions include a sufficient air feed commensurate with the rate of coked catalyst particles entering the regenerator such that the coke is combusted off the catalyst particles under oxidizing conditions at a temperature in the 900° to 1300° F. range.

It has been found that catalysts prepared in accordance with the invention have much higher activity than other rare earth-promoted cracking catalysts wherein the rare earth component is incorporated by soaking the catalyst in a solution containing one or more dissolved rare earth components. On the other hand, the catalysts of the invention have substantially less activity than platinum-promoted catalysts, whose high activity often can cause overheating in the regenerator. From one viewpoint, therefore, the catalyst of the invention is a compromise between the low activity rare earth-promoted catalysts of the prior art and the high activity platinum catalysts commonly used in the art for enhanced carbon monoxide combustion. The advantage the catalyst of the invention has over platinum-promoted catalysts lies in its usefulness over a wide range of operating conditions. For example, when the air feed to the regenerator must be increased to combust coke on heavily coked catalyst particles, or when the feed or temperature unexpectedly increases during an upset condition, a platinum-promoted catalyst could prove so active for oxidizing CO as to release far more heat than the metals in the regenerator can withstand. Thus, the catalyst herein, although less active than the platinum catalyst, is also substantially more useful over a wider range of operating conditions. It provides sufficient activity to increase the amount of CO converted to $CO_2$ in comparison to conventional unpromoted or rare earth-promoted catalysts but not to the extent a highly active platinum-promoted catalyst would.

The following Example is provided to illustrate the invention; it is not intended to limit the scope of the invention as defined by the claims.

COMPARISON EXAMPLE

A comparison experiment was run to compare the CO oxidation activity of catalysts useful in the invention with those of a conventional FCC catalyst and several catalysts promoted with metals by preparation methods different from that of the invention. The catalysts utilized in the experiment were as follows.

Catalyst A

Selected as the conventional FCC catalyst was a catalyst known as CBZ-1, a commercial cracking catalyst sold by Davison Chemical Company, a division of W. R. Grace & Co. This catalyst is in the form of particles having an average diameter of about 60 to 70 microns and is known to comprise a rare earth-exchanged zeolite dispersed in a silica-alumina matrix.

Catalyst B

A rare earth-promoted catalyst comprising 1.9 wt.% La, 0.4 wt.% Ce, 0.7 wt.% Nd, and 0.3 wt.% Pr (all calculated as an $Re_2O_3$ oxide) was prepared by saturating 50 g of CBZ-1 catalyst with 35 ml water containing 6.2 g of liquid Lanthanum-Rare Earth Nitrate sold by Molycorp, Inc., a subsidiary of Union Oil Company of California. Lanthanum-Rare Earth Nitrate is an amber liquid containing 60-65% of rare earth nitrates, with a typical composition of the contained rare earth components as rare earth oxides being: 60.0% $La_2O_3$, 21.5% $Nd_2O_3$, 10.0% $CeO_2$, 7.5% $Pr_6O_{11}$, and 1.0% of other rare earth oxides. The mixture produced by saturating the CBZ-1 catalyst with the rare earth nitrate solution was then diluted with 40 ml of water and allowed to stand overnight. The catalyst was then separated from the impregnant solution, dried at 230° F. for a period of about 24 hours, and calcined by gradually heating the catalyst to 1200° F. over a four hour time period, after which the 1200° F. calcination temperature was maintained for one hour.

Catalyst C

A lanthanum and iron-promoted CBZ-1 catalyst, similar to that described in Example VIII of U.S. Pat. No. 4,137,151, was prepared according to the following procedure. Twenty grams of CBZ-1 was saturated with three aliquots of a 15 ml solution containing 0.56 g $La(NO_3)_3.6H_2O$ and 0.15 g $Fe(NO_3)_3.9H_2O$. One ml of water was then added to the saturated catalyst composite. The resultant powder was then heated under vacuum to 300° F. for two hours and calcined in air for one hour at 350° F. and one hour at 800° F. The resulting catalyst contained 1.2% La (as $La_2O_3$) and 0.2% Fe (as $Fe_2O_3$).

Catalyst D

A solution of 0.9 g La(NO$_3$)$_3$.6H$_2$O dissolved in water was diluted to 23.3 ml. Fifteen milliliters of the resulting solution was then sprayed from a spray bottle onto 20 g of CBZ-1 spread out on a 15 inch by 15 inch tray. The catalyst composite was then calcined in the same manner as Catalyst B, and the final catalyst contained 1.9 wt.% La (as La$_2$O$_3$).

Catalyst E

This catalyst was prepared in the same manner as catalyst D except that the impregnation was accomplished by spraying onto 50 g CBZ-1 6.2 g of the Lanthanum-Rare Earth Nitrate described above with reference to Catalyst B diluted to 35 ml with water. All 35 ml were sprayed onto the CBZ-1 catalyst. The resulting catalyst contained the same weight percentages of rare earth components as Catalyst B.

Catalyst F

This catalyst was prepared in the manner of Catalyst D except that the impregnant solution consisted of 1.5 g Nd(NO$_3$)$_3$.6H$_2$O dissolved in water and diluted to 15 ml. The final catalyst contained 3.0 wt.% Nd (as Nd$_2$O$_3$).

Catalyst G

This catalyst was prepared as Catalyst D except that the impregnant solution consisted of 1.4 g Gd(NO$_3$)$_3$.6H$_2$O dissolved in water and diluted to 15 ml. The final catalyst contained 3.1 wt.% Gd (as Gd$_2$O$_3$).

Catalyst H

This catalyst was also prepared in the manner of Catalyst D but the impregnation was accomplished by spraying onto 100 g of CBZ-1 an aqueous solution containing 2.7 g Ce(NO$_3$)$_3$.6H$_2$O diluted to 70 ml. All 70 ml were sprayed onto the CBZ-1 catalyst. The final catalyst contained 1.1 wt.% Ce (as Ce$_2$O$_3$).

Catalyst I

This catalyst was prepared as follows: An aqueous chloroplatinic acid solution containing 28.4 g Pt/l was diluted to 1 mg Pt/ml with added water, and 1 ml of the diluted solution was then further diluted with 250 ml water. The resulting 251 ml solution was then mixed with 40 g CBZ-1 and stirred. The resulting catalyst composite containing 4 ppm by weight of platinum (as Pt) was calcined at 1200° F. for one hour.

Each of the foregoing catalysts was then identically tested to compare their activities for oxidizing carbon monoxide. The test procedure was as follows: a gas stream consisting essentially of 2.0 vol.% CO, 2.6 vol.% O$_2$, and the balance nitrogen, was passed at 2 psig and 263 ml/min (volume calculated at 1 atmosphere and 70° F.) into a 0.6 inch I.D. oxidation reactor containing 10 g of catalyst. The contacting of catalyst and gas was maintained isothermally at 960° F. The activity of each catalyst was then determined according to the following equation:

$$K = \frac{FT}{273W} \times \log_e\left(\frac{1}{1-x}\right)$$

where K is the activity, F is the total flowrate of gas in ml/min, T is the temperature in °K, W is the mass of the catalyst in grams, and x is the conversion of CO to CO$_2$ expressed as the fraction of vol.% of CO$_2$ in the product to the vol.% of CO in the feed. The results of the foregoing test as applied to the catalysts hereinbefore described are set forth in the following Table.

| | | COMPARISON ACTIVITY | | |
|---|---|---|---|---|
| Catalyst | Impregnation Method | Wt. % Metals in Catalyst[1] | CO Oxidation Activity ml/min/g @ 960° F. | % CO Conversion |
| A | None | 0 | 12 | 15 |
| B | Soaking in Impregnant Solu. | 1.9 La$_2$O$_3$ 0.4 Ce$_2$O$_3$ 0.7 Nd$_2$O$_3$ 0.3 Pr$_2$O$_3$ | 6 | 8 |
| C | Soaking in Impregnant Solu. | 1.2 La$_2$O$_3$ 0.2 Fe$_2$O$_3$ | 10 | 12 |
| D | Spray Impregnation | 1.9 La$_2$O$_3$ | 18 | 21 |
| E | Spray Impregnation | 1.9 La$_2$O$_3$ 0.4 Ce$_2$O$_3$ 0.7 Nd$_2$O$_3$ 0.3 Pr$_2$O$_3$ | 22 | 25 |
| F | Spray Impregnation | 3.0 Nd$_2$O$_3$ | 23 | 26 |
| G | Spray Impregnation | 3.1 Gd$_2$O$_3$ | 24 | 27 |
| H | Spray Impregnation | 1.1 Ce$_2$O$_3$ | 26 | 29 |
| I | Soaking in Impregnant Solution | 0.0004 Pt | 54 | 50 |

[1]Excluding metal in the CBZ-1 base.

As can be seen by the foregoing data, the rare earth-promoted catalysts used in the invention are substantially more active for converting CO to CO$_2$ than are catalysts impregnated with rare earth components by other methods known in the art. On the other hand, the catalysts herein are less active than catalysts containing only 4 ppm of weight of platinum. Thus, the catalysts of the invention have an improved activity for oxidizing CO under widely varying conditions without being so active as to allow excessive heat to generate in the regenerator of a cracking unit.

Although the invention has been described in conjunction with a preferred embodiment and specific examples thereof, it is apparent that many modifications, alternatives, and variations will be apparent to those skilled in the art in light of the foregoing description. Accordingly, it is intended to embrace all such modifications, alternatives, and variations as fall within the spirit and scope of the appended claims.

I claim:

1. In a process for catalytically cracking hydrocarbons wherein coke-containing cracking catalyst particles are regenerated by combusting said coke in the presence of oxygen and under oxidizing conditions and at elevated temperatures so as to remove the coke from the surfaces of said catalyst particles and thereby regenerate said catalyst particles for cracking hydrocarbons while producing a carbon monoxide-containing flue gas, the improvement comprising reducing the amount of carbon monoxide emitted during the combustion of said coke by utilizing catalyst particles in said catalytic cracking process containing one or more rare earth components incorporated by the method including the steps of:

(a) spraying in the form of a mist an impregnant solution containing one or more dissolved rare earth components onto cracking catalyst particles comprising a crystalline aluminosilicate zeolite having substantial activity for cracking hydrocarbons; and (b) calcining the resulting composite particles at an elevated temperature so as to convert said one or more rare earth components to the oxides thereof.

2. A process as defined in claim 1 wherein at least some of said catalyst particles were previously used in a catalytic cracking unit for cracking hydrocarbons.

3. In a process for catalytically cracking hydrocarbons wherein a hydrocarbon feedstock is converted in a catalytic cracking reaction zone to more valuable hydrocarbons of lower average molecular weight and lower average boiling point by contact with cracking catalyst particles at an elevated temperature, and wherein coke deposited on said cracking catalyst particles during the cracking reactions taking place in said reaction zone is combusted off said cracking catalyst particles in a regeneration zone so as to regenerate the catalyst particles for subsequent use in said reaction zone, the improvement for reducing the amount of carbon monoxide discharged with the combustion flue gases from said regeneration zone comprising utilizing catalyst particles containing one or more rare earth components incorporated on said cracking catalyst particles by a method including the steps of:

(a) spraying in the form of a mist an impregnant solution containing one or more dissolved rare earth components onto catalyst particles comprising a crystalline aluminosilicate zeolite dispersed in a porous refractory oxide matrix, said catalyst particles having substantial activity for cracking hydrocarbons;

(b) drying said catalyst particles; and (c) calcining said catalyst particles at an elevated temperature sufficient to convert said one or more rare earth components to the oxides thereof.

4. In a cyclic catalytic cracking process wherein a hydrocarbon feedstock is fed to a catalytic cracking reaction zone and therein contacted with cracking catalyst particles containing a crystalline aluminosilicate zeolite having a substantial proportion of its ion exchange sites occupied with hydrogen ions at an elevated temperature and under conditions sufficient to convert said feedstock to more valuable hydrocarbons of lower average molecular weight and lower average boiling point than said feedstock while said catalyst particles become deactivated with coke deposits, and said catalyst particles are reactivated in a regeneration zone by burning said coke off said catalyst particles, thereby producing a flue gas containing carbon monoxide and carbon dioxide, and said catalyst particles are then recycled to said catalytic cracking reaction zone, the improvement comprising reducing the rate at which carbon monoxide is discharged from said regeneration zone on a mass per hour basis while increasing the rate at which carbon dioxide is discharged from said regeneration zone on a mass per hour basis by incorporating in said catalyst particles one or more rare earth components by the method including the steps of:

(a) uniformly impregnating said catalyst particles by spraying in the form of a mist an impregnant solution containing one or more dissolved rare earth components onto said catalyst particles, said solution having a volume in proportion to the volume of impregnated catalyst particles between about 0.5:1 and about 2.0:1;

(b) drying said catalyst particles at a temperature less than about 400° F.; and (c) calcining said catalyst particles in the presence of air at a temperature above about 900° F.

5. A process as defined in claim 3 or 4 wherein said one or more rare earth components are selected from the group consisting of lanthanum, cerium, gadolinium, neodymium, and combinations thereof.

6. A process as defined in claim 3 or 4 wherein said one or more rare earth components comprise a mixture of rare earth metal compounds obtained from a rare earth ore.

7. A process as defined in claim 3 or 4 wherein said impregnant solution in step (a) has a volume in proportion to the volume of catalyst particles impregnated of between about 0.5:1 to 0.75:1.

8. A process as defined in claim 3 or 4 wherein step (b) is accomplished by allowing said catalyst particles to dry under ambient conditions for at least one hour.

9. A process as defined in claim 3 or 4 wherein step (b) is accomplished at an elevated temperature and for a time period of at least about 10 minutes.

10. A process as defined in claim 9 wherein said elevated temperature in step (b) is between about 100° and 400° F.

11. A process as defined in claim 3 or 4 wherein said catalyst particles obtained in step (c) contain between about 1 and 10 wt.% of total rare earth components, calculated as $Re_2O_3$.

12. A process as defined in claim 1, 3, or 4 wherein said crystalline aluminosilicate zeolite in said catalyst particles is a zeolite X or Y containing sodium in a proportion less than about 0.5 wt.%, calculated as sodium.

13. A process as defined in claim 12 wherein said zeolite in said catalyst particles is zeolite Y having a substantial proportion of its ion exchange sites occupied with hydrogen ions.

14. A process as defined in claim 12 wherein said zeolite in said catalyst particles is zeolite Y containing a substantial proportion of rare earth element ions in the ion exchange sites.

15. A process as defined in claim 1, 3, or 4 wherein said crystalline aluminosilicate zeolite in said catalyst particles has a sodium content less than about 0.5 wt.%, calculated as sodium.

* * * * *